United States Patent [19]

Chevillat et al.

[11] Patent Number: 4,607,343

[45] Date of Patent: Aug. 19, 1986

[54] APPARATUS AND METHOD FOR PERFORMING DIVISION WITH AN EXTENDED RANGE OF VARIABLES

[75] Inventors: Pierre Chevillat, Adliswil; Dietrich Maiwald, Wadenswil, both of Switzerland

[73] Assignee: International Business Machines Corp., Armonk, N.Y.

[21] Appl. No.: 555,245

[22] Filed: Nov. 25, 1983

[30] Foreign Application Priority Data

Dec. 23, 1982 [EP] European Pat. Off. ........ 82111929.4

[51] Int. Cl.[4] ....................... G06F 7/52; G06G 7/164
[52] U.S. Cl. .................................... 364/765; 364/850
[58] Field of Search ............... 364/765, 761, 762, 763, 364/850

[56] References Cited

U.S. PATENT DOCUMENTS

| 3,305,676 | 2/1967 | Honore et al. | 364/850 |
| 3,633,018 | 1/1972 | Ling | 364/765 |
| 3,648,038 | 3/1972 | Sierra | 364/765 |
| 3,777,132 | 12/1973 | Bennett, Jr. | 364/765 |
| 4,047,011 | 9/1977 | Bennett | 364/765 |

OTHER PUBLICATIONS

Ferrari, "A Division Method Using a Parallel Multiplier", *IEEE Trans. on Electronic Computers*, Apr. 1967, pp. 224–226.

Stetanelli, "A Suggestion for a High-Speed Parallel Binary Divider", *IEEE Trans. on Computers*, vol. C-21, No. 1, Jan. '72, pp. 42–55.

Wong, "Analog ICs Divide Accurately to Conquer Computation Problems", *Electronics*, Apr. 12, 1979, pp. 120–127.

Primary Examiner—David H. Malzahn
Attorney, Agent, or Firm—John B. Frisone

[57] ABSTRACT

A method and apparatus are disclosed which, for obtaining the quotient of division operations in a data processing apparatus, generate as an auxiliary value the inverse square root g of the divisor w. The auxiliary value g is then multiplied by the divident v, and the intermediate result again multiplied by the auxiliary value g. An improvement in operation of the data processing apparatus is obtained despite introduction of the auxiliary value because the range covered by the auxiliary value is significantly smaller than that of the direct inverse of the divisor. A preferred application is the area of signal processing in communications.

3 Claims, 3 Drawing Figures

APPARATUS AND METHOD FOR PERFORMING DIVISION WITH AN EXTENDED RANGE OF VARIABLES

FIELD OF THE INVENTION

The present invention is concerned with a method of operating a data processing apparatus and with an arithmetic apparatus, for generating the quotient of two operands. The invention can also be used for generating the reciprocal of an operand. It is useful particularly in signal processing applications, e.g. in communication modems, where large dynamic ranges have to be accommodated with circuitry of limited precision.

BACKGROUND ART

Several methods for dividing one quantity by another, or for determining the inverse of a quantity are known. They include:

(a) Subtracting the divisor from the dividend repetitively until the remainder is less than the divisor;

(b) Repetitive subtraction with shifting after determination of each quotient digit;

(c) Subtraction of prestored divisor multiples from dividend, with shifting;

(d) Approximation by another function, e.g., power series.

The known methods are disclosed, e.g., in U.S. Pat. Nos. 3,631,230, 3,684,038 and 4,084,254, and in an article "Approximating division by a constant" by R. L. Ho, IBM Technical Disclosure Bulletin, Vol. 22, No. 4, September 1979, pp. 1554-1557.

A major problem in the design of arithmetic circuitry, particularly for division, is that with a given accuracy of the circuitry or technique, only a limited range of variables can be handled. For variables at the margin or outside of that range, no useful results can be obtained because the errors may be too large. Increased accuracy can only be obtained at the cost of more expensive hardware, or duplication of certain arithmetic elements, or by slower operation of the circuitry due to an increase in the number of repetitive operations.

SUMMARY OF THE INVENTION

It is an object of the present invention to devise a new division technique which permits, for a given range of variables, the use of less accurate or simpler arithmetic circuitry, or for a given apparatus a reduced number of repetitive cycles, than with known techniques. A further object is a method of operating data processing apparatus in a special way for division operations so that it can handle a wider range of operands but obtain results of the same accuracy. Another object is to devise arithmetic apparatus for division which can handle a wider range of variables or generate more accurate results than known apparatus of the same complexity or amount of hardware.

The invention permits an extension of the range of variables, e.g. in communication signal processing, that can be handled by apparatus of a given complexity.

BRIEF DESCRIPTION OF THE DRAWINGS

In the following, the underlying principle and two embodiments of the invention will be described in connection with the drawings.

In the drawings.

DESCRIPTION OF PREFERRED EMBODIMENTS

Principle of Division Technique

Consider performing the division operation $u=v/w$ by determining first the inverse $1/w$ and then multiplying by v. The inverse may be obtained in various known ways, e.g. those mentioned in the introduction.

For example, in the case of approximating $1/w$ by a power series, a good approximation requires many high-order terms because this function is relatively "steep".

It is now suggested for a division operation to avoid the direct computation of the inverse $1/w$, and instead to use as an auxiliary quantity the function $g=1/\sqrt{w}$. The invention suggests performing the division by determining $$u = v/w = (v \cdot 1/\sqrt{w}) \cdot 1/\sqrt{w} \tag{1}$$

which can also be written as $$u = v/w = (v \cdot g)g. \tag{1a}$$

Figure 1:
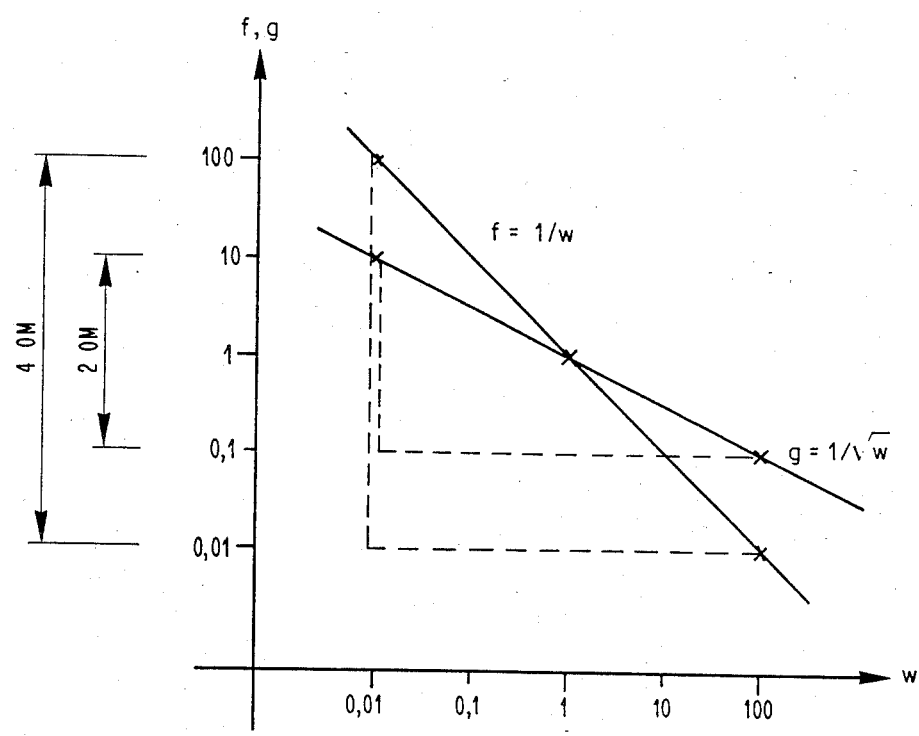
FIG. 1 is a graphical comparison of the direct inverse function of a quantity and its inverse square root, illustrating the difference in steepness that is ultilized by the invention.

As is illustrated in FIG. 1, the function $g=1/\sqrt{w}$ is much less steep than the direct inverse $f=1/w$. In other words, for the same range of input values for operand w, function g needs only half the value range (e.g. two orders of magnitude) as compared to function f (which would need four orders of magnitude).

Thus, the new division technique defined by (1) and (1a) avoids the large value range of the direct inverse $f=1/w$, i.e. it covers much smaller ranges of values during computation. The method can of course also be used for determining the inverse of a quantity w by just choosing the dividend v to be equal to 1.

Consequences for Implementation

Typically, arithmetic devices need, when a given accuracy is required, more complex hardware or computation techniques when the range of the variables increases. It is obvious from FIG. 1, that with the new division method, the same accuracy of the final result (i.e. the quotient) can be achieved either with less complex hardware, or with fewer operating cycles, thus achieving a higher speed of operation.

An example of such reduced requirements or saving in hardware will be given at the end of the specification.

Generation of Auxiliary Function g

The value of $g=1/\sqrt{w}$ for a given value of w can be determined in a number of ways. A good approach is to use the power series approximation $$g = 1/\sqrt{w} = C_0 + C_1 \cdot w + C_2 \cdot w^2 + \ldots C_N \cdot w^N \tag{2}$$

Due to the reduced steepness or value range of the inverse square root, good results can be obtained with fewer terms, e.g. with a power series approximation of order N=2

$$g = 1/\sqrt{w} = C_0 + C_1 \cdot w + C_2 w^2 \qquad (2a)$$

For obtaining results with equal accuracy, more terms and thus more hardware or computation cycles would be required in a case where the direct inverse $f = 1/w$ is utilized.

The coefficients will be selected in advance for a given application. Procedures for determining these coefficients are well known. See, e.g. Bronstein-Semendjajew: "Taschenbuch der Mathematik", Section 3.4.7.3, (Thun/Frankfurt 1979). An example is given at the end of the specification. The coefficients can be determined so that, for the desired range of w, the mean-square error $$\int_{W_{min}}^{W_{max}} ([C_0 + C_1 \cdot w + C_2 \cdot w^2 + \ldots + C_N \cdot w^N] - 1/w)^2 dw$$

is minimized.

Two embodiments in which the inverse square root is generated by such power series approximation will be described in the following. It is assumed that the required values of the constants $C_i$ were selected in advance in each case.

First Embodiment Using Analog Circuitry

Figure 2:
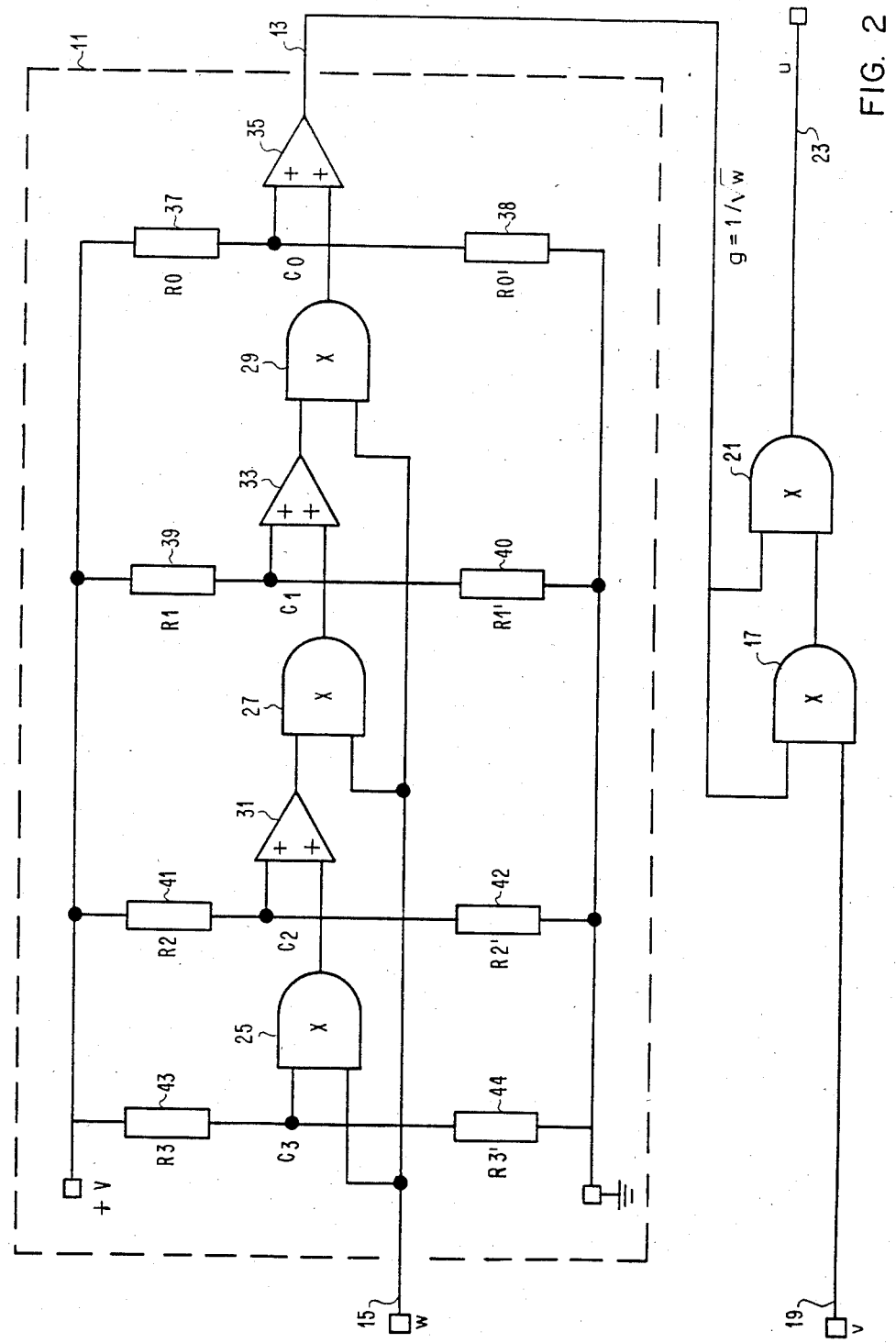
FIG. 2 is a block diagram of a first embodiment of the division apparatus using analog technology.

FIG. 2 shows a first embodiment of the new division technique, consisting of analog circuits for handling analog signals. It represents an approximation of third order, i.e. it is based on the four-term power series $$g = 1/\sqrt{w} = C_0 + C_1 \cdot w + C_2 \cdot w^2 + C_3 \cdot w^3.$$

Unit 11 provides on its output line 13 the inverse square root function g from the value of divisor w which it receives on input line 15. A multiplier 17 is provided whose inputs are connected to line 13 and to another input line 19 on which a value for dividend v is furnished. A second multiplier 21 is connected with its inputs to the outputs of unit 11 (line 13) and of multiplier 17, respectively. On its output line 23, it furnishes the quotient u.

Unit 11 which generates the inverse square root comprises three multipliers 25, 27, and 29, three adders 31, 33, and 35, and eight resistors 37 ... 44. These resistors are connected in pairs between ground and a given voltage +V. The ratio between the two resistors of each pair is selected such that at the intermediate point, a voltage is available which corresponds to the constant value $C_0$, $C_1$, $C_2$, and $C_3$, respectively, as shown in FIG. 2. Selection of the constant values per se is made in accordance with the method mentioned above (minimization of mean-square error for a given power series).

One input of each of the three multipliers 25, 27, 29 is connected to input 15. The second input of multiplier 25 is connected to the intermediate point of resistor pair 43/44 (constant $C_3$). The inputs of adder 31 are connected to the output of multiplier 25 and to the intermediate point of resistors 41/42 (constant $C_2$), respectively. Its output is connected to the second input of multiplier 27. The inputs of adder 33 are connected to the output of multiplier 27 and to the intermediate point of resistors 39/40 (constant $C_1$), respectively. Its output is connected to the second input of multiplier 29. The inputs of adder 35 are connected to the output of multiplier 29 and to the intermediate point of resistors 37/38 (constant $C_0$), respectively. The output of adder 35 furnishes the sum $$g = C_0 + C_1 \cdot w + C_2 \cdot w^2 + C_3 \cdot w^3$$

as required.

Second Embodiment Using Digital Circuitry

Figure 3:
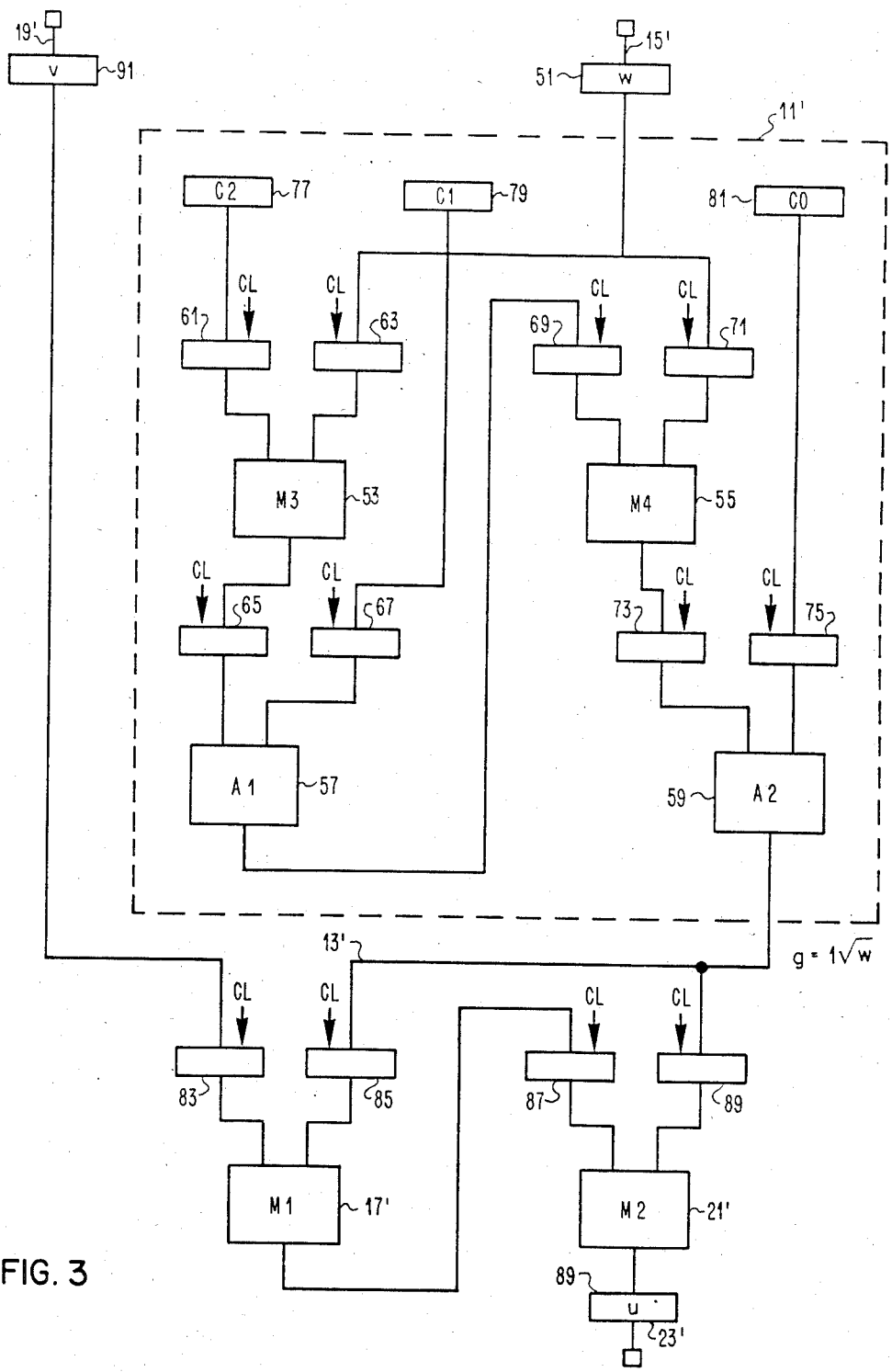
FIG. 3 is a block diagram of a second embodiment of the invention employing digital elements.

A second embodiment of the invention, using digital functional units for handling digital signals, is shown in FIG. 3. It also comprises a unit 11' for generating the inverse square root of an input variable w, as well as an intermediate multiplier 17'(M1) and a final multiplier 21'(M2).

Unit 11' represents a second order approximation of the inverse square root, as given in equation (2a). Input variable w, the divisor, furnished on line 15', is held in a register 51. Unit 11' comprises two multipliers 53 and 55, designated M3 and M4, respectively, and two adders 57 and 59, designated A1 and A2, respectively. Clocked buffer registers 61, 63, 65, 67, 69, 71, 73, and 75 are provided at the inputs of multipliers M1 and M2 and of adders A1 and A2. They change their contents when a clock pulse CL appears.

For constants $C_0$, $C_1$, and $C_2$, storage elements 77, 79, and 81 are provided. They could be read-only devices in applications where the range of input variable does not change. If more flexibility is desired, storage elements 77, 79, and 81 can be designed as loadable registers.

Buffers 61 and 63 are connected to registers 77 ($C_2$) and 51 (w), respectively. They furnish their contents to the two inputs of multiplier 53 (M3) which, in turn, furnishes its output to buffer 65. Buffer 67 is connected to register 79 ($C_1$). Buffers 65 and 67 furnish their contents to adder 57 (A1) which, in turn, furnishes its output to buffer 69. Buffer 71 is connected to register 51 (w). Buffers 69 and 71 furnish their contents to multiplier 55 (M4) which, in turn, furnishes its output to buffer 73. Buffer 75 is connected to register 81 ($C_0$). Buffers 73 and 75 furnish their contents to adder 59 (A2).

Finally, adder 59 (A2) which generates the sum of the quantities stored in its input registers 73 and 75, furnishes this sum as the inverse square root 1/w or function g at its output to connection 13'.

The circuitry of FIG. 3 comprises also multiplier M1 (17') having clocked input buffers 83 and 85, and multiplier M2 (21') having clocked input buffers 87 and 89. Input buffer 83 of M1 is connected to the output of a register 91 which is provided for receiving quantity v, the dividend, from input line 19'. Input buffers 85 and 89 are both connected to the output of A2, i.e. to connection 13'. Multiplier M1 furnishes the product of the contents of its input buffers 83 and 85 to buffer 87. Multiplier M2 generates the product of the quantities stored in its input buffers 87 and 89, and it stores this product which is the quotient u in an output register 93. Quotient u is then available on output line 23' of the whole circuit arrangement.

Alternative Solutions

In the two embodiments shown, unit 11 or 11' which develops the inverse square root function g from input variable w was based on a power series approximation. Other means for generating $g=1/\sqrt{w}$ can of course be used, e.g. in a digital environment a table look-up arrangement comprising a read-only store (ROS), or circuitry executing an iterative procedure for obtaining first the square root and then the inverse of a given quantity. For an analog solution, a function generator of known design can be used.

Application in Communications

The inverse-square-root divider described above was implemented as part of a fast-startup full-duplex telephone-line modem. Usage of the divider is as follows:

When transmission begins, the transmitter sends a periodic signal r(t) with spectrum R(f). Since R(f) is known to the receiver, it can be used to synthesize the linear filter (equalizer) whose transfer function C(f) is the inverse of the unknown channel transfer function. The receiver stores one period of the received signal s(t), computes the Fourier transform S(f) of this signal, divides the spectral values R(f) of the known transmitted signal by the spectral values S(f) of the received signal, and obtains the Fourier transform C(f) of the equalizer impulse response c(t). Finally, an inverse Fourier transform yields c(t) and the desired coefficients of the equalizer.

The required spectral division $C(f)=R(f)/S(f)$ is obtained by the novel division technique disclosed above, based on a determination of the inverse square root of S(f).

Due to the amplitude distortions of the transmission channel, S(f) can vary over a large range. Use of the disclosed division technique tolerates amplitude distortions from $-24$ dB to 6 dB, whereas using the direct inverse of S(f) under otherwise equal conditions would accommodate a much smaller range of amplitude distortions.

The following was experienced when the invention was used in this modem application in which results must be furnished in real-time: With a given width of the signal paths (16 bits), the multipliers (12×12 bits), and the other functional units (20 bits), under given time constraints and with a given limit for the error rate, the new division technique enabled successful operation whereas with the conventional approach of using the direct inverse, operation was not satisfactory for very large values of amplitude distortion due to the inherent greater inaccuracy which led to an intolerable accumulation of errors.

Appendix: Examples

Determination of Coefficients in Approximation for g:

For the case of a second-order power series approximation of the auxiliary function g as given in equation (2a), the three coefficients can be determined in dependence of the medium value $w_0$ of the desired range of operand w as follows $$C_0=15/8 \cdot w_0^{-\frac{1}{2}}, \quad C_1=5/4 \cdot w_0^{-3/2}, \quad C_2=3/8 \cdot w_0^{-5/2}$$

Savings in a ROM Implementation:

Consider the inverse functions $f=1/w$ and $g=1/\sqrt{w}$ were implemented by an addressable ROM. Input variable w is to be used as a ROM address, and the value of function f or g is the ROM output.

For a range of input values 1 ... 256, 8 bits will be required to address the 256 stored results. In the case of $f=1/w$, output values span the range $1/1 \ldots 1/256$, i.e. the largest value needs 8 more bits than the smallest. If the smallest must have a precision of 4 bits, $8+4=12$ bits are required to distinguish all values, i.e. the store must have a capacity of 256×12 bits. In the case of $g=1/\sqrt{w}$, the output values span the range $1/1 \ldots 1/16$, i.e. the largest value needs 4 more bits than the smallest. If the smallest must have the same precision as in the other case, i.e. 4 bits, only $4+4=8$ bits are required to distinguish all values, i.e. the store must have a capacity of 256×8 bits. Thus, a significant saving is achieved if only the inverse square root values must be provided during operation.

Having thus described our invention, what we claim as new, and desire to secure by Letters Patent is:

1. Method of operating a data processing apparatus for obtaining the value of the quotient (u) of a dividend (v) and a divisor (w), characterized by the following steps:

initially generating the inverse square root of the divisor (w) as an auxiliary value (g), by accumulating the sum value of a series $C_0+C_1w+C_2w^2+ \ldots +C_nw^n$ in generating means (11; 11') comprising storage means (37 ... 44; 77 ... 81) furnishing appropriate values for $C_0, C_1, C_2, \ldots C_n$, first multiplying means (25 ... 29; 53, 55), and adding means (57, 59);

multiplying in second multiplying means (17; 17') the dividend (v) by said auxiliary value (g) to obtain an intermediate value; and multiplying in third multiplying means (21; 21') said intermediate value by said auxiliary value (g) for generating the quotient value (u).

2. Arithmetic apparatus for furnishing the quotient (u) of a dividend (v) and a divisor (w), including first and second storage means (91, 51) for storing said dividend and divisor, respectively, said apparatus comprising:

generating means (11') connected to receive the output of said second storage means (51), for generating at its output the reciprocal value of the square root of said divisor (w) as an auxiliary value (g), said generating means comprising circuitry (25 ... 35; 61 ... 75) for accumulating said auxiliary value as $g=\{(C_n \cdot w^{n-2} \ldots +C_2)w+C_1\}w+C_0$, by alternating multiplication and addition, and comprising third storage means (37 ... 44; 77 ... 81) for predetermined appropriate constant values $C_0, C_1, C_2, \ldots C_n$;

first multiplying means (17') connected to receive the outputs of said first storage means (91) and of said generating means (11), for multiplying said dividend (v) by said auxiliary value (g) to obtain an intermediate product, and second multiplying means (21') connected to receive the outputs of said first multiplying means (17') and said generating means (11'), for multiplying said intermediate produce by said auxiliary value (g), thus producing at its output (13') a representation of the quotient (u) of said dividend and said divisor.

3. Arithmetic apparatus in accordance with claim 2, characterized in that said generating means (11') for generating the auxiliary value (g) comprises fourth, fifth, and sixth storage means (77, 79, 81) for furnishing first, second, and third constant values ($C_2$, $C_1$, $C_0$), respectively;

third multiplying means (53) connected to receive the outputs of said second storage means (51) and said fourth storage means (77);

first adding means (57) connected to receive the outputs of said third multiplying means (53) and said fifth storage means (79);

fourth multiplying means (55) connected to receive the outputs of said first adding means (57) and said second storage means (51); and second adding means (59) connected to receive the outputs of said fourth multiplying means (55) and said sixth storage means (81), the output of this second adding means (59) furnishing the auxiliary value (g) on the output (13') of the generating means (11').

* * * * *